United States Patent [19]
Drossel et al.

[11] Patent Number: 5,398,719
[45] Date of Patent: Mar. 21, 1995

[54] PRESSURE PROTECTION INSTALLATION FOR A PRESSURE VESSEL

[75] Inventors: Rolf Drossel, Erlangen; Erwin Laurer, Möhrendorf, both of Germany

[73] Assignee: Siemens Aktiengesellschaft, Munich, Germany

[21] Appl. No.: 80,569

[22] Filed: Jun. 21, 1993

[30] Foreign Application Priority Data

Dec. 21, 1990 [DE] Germany .................. 40 41 418.3

[51] Int. Cl.⁶ .............................................. F16K 17/02
[52] U.S. Cl. .................................. 137/489.5; 137/492
[58] Field of Search ........................... 137/489.5, 492

[56] References Cited

U.S. PATENT DOCUMENTS

| 80,461 | 7/1868 | Davis | 137/489.5 |
|---|---|---|---|
| 221,194 | 11/1879 | Scovell | 137/492 |
| 559,881 | 5/1896 | Ahrens et al. | 137/489.5 |
| 1,089,904 | 3/1914 | Cole | 137/489.5 |
| 1,304,162 | 5/1919 | Schamps | 137/489.5 |
| 2,587,212 | 2/1952 | Placette | 137/489.5 |
| 2,955,612 | 10/1960 | Moser | 137/489.5 |
| 3,084,706 | 4/1963 | Lunde . | |
| 3,095,012 | 6/1963 | McShane . | |
| 4,977,925 | 12/1990 | Tiefenthaler | 137/489.5 |

FOREIGN PATENT DOCUMENTS 1445880 6/1966 France .

Primary Examiner—Gerald A. Michalsky
Attorney, Agent, or Firm—Herbert L. Lerner; Laurence A. Greenberg

[57] ABSTRACT

A combination pressure vessel and pressure protection installation for the pressure vessel includes a connector pipe connected to the pressure vessel. A valve assembly has a housing block disposed directly on the connector pipe and has at least one safety valve to be hydraulically actuated by a medium brought from the pressure vessel. Lines bring the medium to the safety valve. The lines are guided in segments inside the pressure vessel, the connector pipe and the housing block.

4 Claims, 1 Drawing Sheet

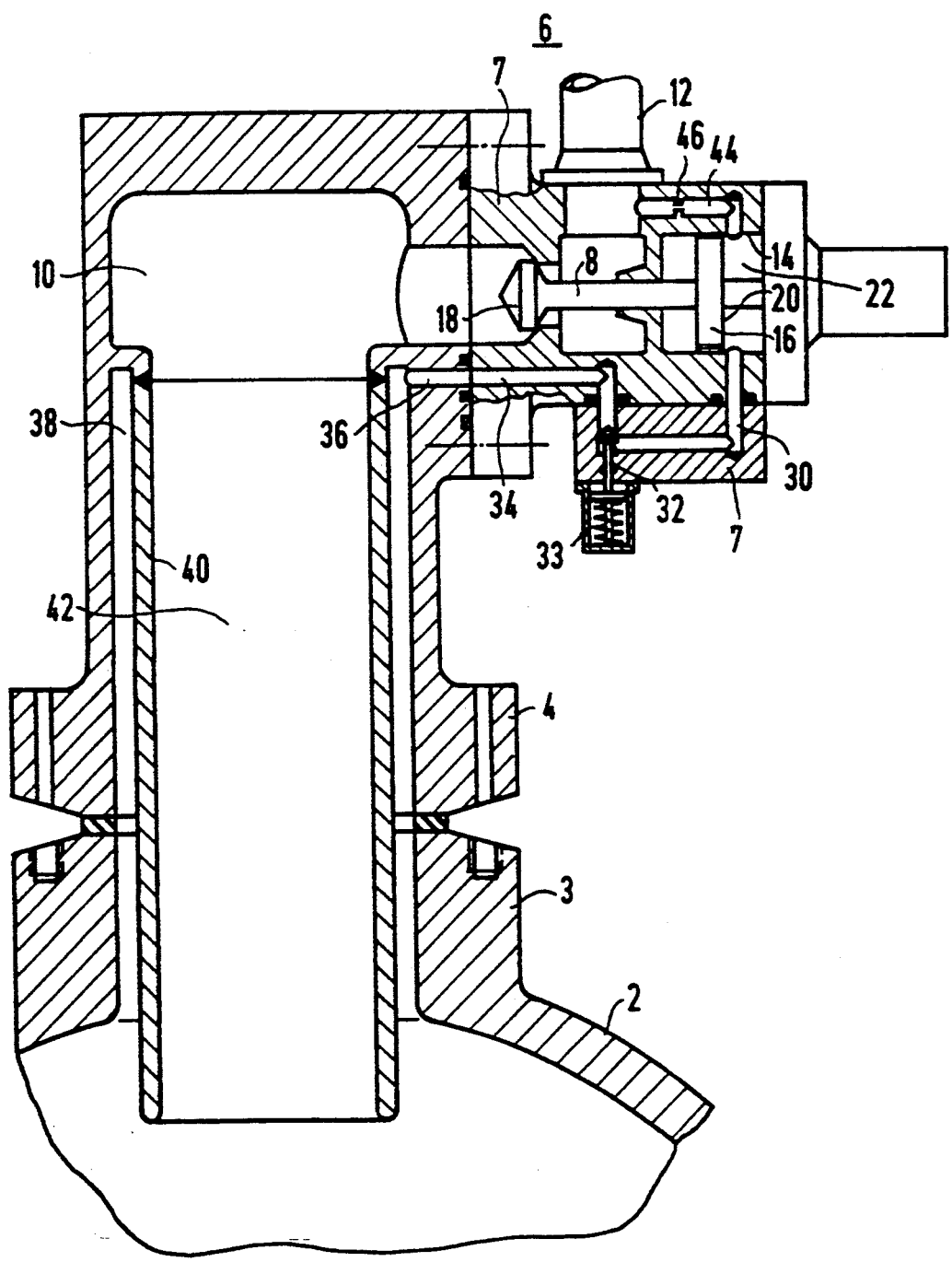

PRESSURE PROTECTION INSTALLATION FOR A PRESSURE VESSEL

CROSS-REFERENCE TO RELATED APPLICATION

This application is a Continuation of International Application Ser. No. PCT/DE91/00991, filed Dec. 18, 1991.

BACKGROUND OF THE INVENTION

FIELD OF THE INVENTION

The invention relates to a pressure protection installation or safety-valve unit for a pressure vessel or pressurized container, particularly for a pressure holding station in the primary loop of a pressurized water reactor.

The operating pressure, for instance approximately 155 bar, prevailing in the primary loop of a pressurized water reactor must not be substantially exceeded, if an overload on primary loop components are to be avoided in the event that heat liberated in the interior of the reactor pressure vessel cannot be dissipated by coolant to a sufficient extent.

In order to keep the pressure within the primary loop below the allowable maximum pressure of approximately 170 bar, for instance, so-called pressure holding stations are provided, which include a pressure holder that is connected to the primary loop and is also connected to a blowoff line, through a valve assembly. As a rule, the fixture is a safety valve actuated by the medium located in the pressure vessel. To that end, the safety valve may be opened by a piston that is disposed displaceably in a cylinder which can be acted upon by pressure. The imposition of pressure is performed through a pressure bleeding line that is connected to the pressure vessel and is connected through a control valve to the control chamber of the cylinder. Through this pressure bleeding line, if needed, the static pressure prevailing in the pressure vessel is conducted to the piston of the safety valve when the control valve is open and brings about an opening of the safety valve.

The internal pressure of the pressure vessel always prevails in the pressure bleeding line. In the event of a response, the control line disposed between the control valve and the safety valve cylinder is additionally acted upon by high pressure. For the sake of redundancy, a plurality of independently operating control valves, for instance four of them, are provided for one safety valve. However, the pipelines required for that purpose represent an additional risk factor in the event of an explosion.

SUMMARY OF THE INVENTION

It is accordingly an object of the invention to provide a pressure protection installation for a pressure vessel, which overcomes the hereinafore-mentioned disadvantages of the heretofore-known devices of this general type.

With the foregoing and other objects in view there is provided, in accordance with the invention, a combination pressure vessel and pressure protection installation for the pressure vessel, comprising a pressure vessel; a connector pipe connected to the pressure vessel; a valve assembly having a housing block disposed directly on the connector pipe and having at least one safety valve to be hydraulically actuated by a medium brought from the pressure vessel; and lines for bringing the medium to the safety valve, the lines being guided in segments inside the pressure vessel, the connector pipe and the housing block.

The pressure bleeding line and the control line connected to it extend entirely inside a compact housing unit that is formed by the pressure vessel, the connector pipe and the housing block of the valve assembly. Since the valve assembly containing the safety valve is disposed directly on a connector pipe of the pressure vessel, without the intervening connection of exposed pipelines, and the pressure bleeding lines and the control lines are in the form of conduits disposed inside the pressure vessel and the connector pipe, or inside the housing block of the valve assembly, a rupture of the pressure bleeding and control lines is practically precluded. Moreover, a compact structure of the entire configuration is made possible.

In accordance with another feature of the invention, in order to provide the hydraulic actuation of the safety valve within the pressure vessel and the connector pipe, means are preferably provided for bleeding off the static vessel pressure, which is unaffected by the flow process during the blowoff, and the means for pressure bleeding are connected directly to a pressure bleeding conduit extending in the housing block.

In accordance with a further feature of the invention, the connector pipe is lengthened in tubular fashion and has a pressure bleeding opening that is spatially separated from the flow conduit of the medium to be blown off by means of a cuff leading into the interior of the pressure vessel. This provision assures that all of the static pressure prevailing in the interior of the pressure vessel is always available to actuate the control valve and therefore is also always available in the control chamber of the safety valve, if the pressure in the flow conduit drops as a result of the blowoff process as it commences.

Instability of the control valve and therefore of the safety valve is avoided thereby.

In accordance with a concomitant feature of the invention, the valve assembly is disposed radially on the tubularly lengthened connector pipe. As a result, in order to increase redundancy, a plurality of structurally identical valve assemblies can be disposed in a star or radial pattern on the connector pipe.

Other features which are considered as characteristic for the invention are set forth in the appended claims.

Although the invention is illustrated and described herein as embodied in a pressure protection installation for a pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a fragmentary, diagrammatic, sectional view of an exemplary embodiment of a pressure protection installation according to the invention for a pressure vessel.

DESCRIPTION OF THE PREFERRED EMBODIMENTS

Referring now to the single FIGURE of the drawing in detail, there is seen a pressure vessel 2 with a connector pipe 4 which, for instance, is cylindrical, and to which a valve assembly 6, that includes a plurality of valves, is radially flanged directly by a housing block 7 thereof. The housing block 7 may be assembled from a plurality of housing parts. The connector pipe 4, in the example shown in the drawing, is flanged to a short connector pipe 3 of the pressure vessel 2. However, the connector pipe 4 may also be welded directly to the pressure vessel 2.

The valve assembly 6 connects the interior of the pressure vessel 2 to a blowoff line 12, through the connector pipe 4 and a safety valve 8. The safety valve 8 includes a piston 16 which is movable in a cylinder 14. The piston 16 has a closure piece 18 and a surface 20 facing away from the closure piece 18 which can be acted upon by pressure.

Upon the imposition of pressure that, for instance, is equivalent to the static pressure in the pressure vessel 2, the closure piece 18 moves to the left in the example shown in the drawing, and opens an interior chamber 10 of the connector pipe 4 to the blowoff line 12. This occurs as a result of the larger effective area of the surface 20 of the piston 16 as compared with the closure piece 18. The imposition of pressure on the piston 16 in the event of a response is effected by means of the medium located in the pressure vessel 2. For that purpose, a control chamber 22 of the cylinder 14 is connected to a control conduit 30, which communicates with a pressure bleeding conduit 34 through a control valve 32. The control conduit 30 and the pressure bleeding conduit 34 extend in the form of bores inside the housing block 7 of the valve assembly 6, for example, so that exposed pipelines are not required.

The pressure bleeding conduit 34 is connected to a pressure bleeding opening 36 located in the connector pipe 4. The pressure bleeding opening 36 leads into an annular interior chamber 38, which is separated from a flow conduit 42 leading to the blowoff line 12 by a cuff 40. The hollow-cylindrical cuff 40 extends as far as the interior of the pressure vessel 2, so that the pressure present at the pressure bleeding opening 36 is equivalent to the pressure prevailing in the pressure vessel 2, even whenever the flow conduit 42 has a flow of pressure medium through it when the safety valve 8 responds. Elements 30, 34 and 38 therefore are lines for bringing the medium to the safety valve 8. The line 38 is a line for pressure bleeding which discharges into a region of the pressure vessel 2 in which a static vessel pressure being substantially unaffected by a flow process during blowoff prevails.

The control valve 32, which by way of example is prestressed to a pressure equivalent to approximately 170 bar, for instance by a compression spring 33, remains reliably open if the pressure in the pressure vessel 2 is exceeded, because the flow commencing inside the cuff 40 and in the interior chamber 10 of the connector pipe 4 has no influence on the pressure prevailing in the pressure bleeding line 34.

Upon reaching the closing pressure, which by way of example may be 10% below the response pressure, the control valve 32 closes, and the control chamber 22 of the cylinder 14, which is acted upon by pressure, is vented into the blowoff line 12 through a conduit 44 provided with a throttle 46.

In the example shown in the drawing, the valve assembly or fixture 6 has only one control conduit 30, one control valve 32 and one pressure bleeding conduit 34. For safety reasons, however, a plurality of pressure bleeding conduits 34, control valves 32 and control conduits 30 may be provided in the valve assembly or fixture 6. Moreover, each control conduit 30 and each pressure conduit 34 may additionally be provided with manually actuatable valves, for instance in order to turn off the control valve 32 if it has come to leak during operation and to turn on a control valve in its place that until then had been kept shut off in reserve.

Due to the tubularly lengthened form of the connector pipe 4, the preferred embodiment shown in the drawing enables the attachment of a plurality of structurally identical valve assemblies in a star or radial pattern. This considerably increases the redundancy.

If safety requirements are not so stringent, a lengthened connector pipe 4 is not necessary, and the valve assembly 6 can be disposed directly on the end surface of the short connector pipe 3.

In order to bleed off the static pressure, it is also possible to provide one or more conduits being connected to the pressure bleeding conduit 34 of the valve assembly 6 and leading inside the pressure vessel 2 into a zone substantially unaffected by the flow, instead of an annular conduit as in the exemplary embodiment shown in the drawing.

We claim:

1. A combination pressure vessel and pressure protection installation for the pressure vessel, comprising:
   a pressure vessel;
   a connector pipe connected to said pressure vessel;
   a valve assembly having a housing block disposed directly on said connector pipe and having at least one safety valve to be hydraulically actuated by a medium brought from said pressure vessel; and
   lines for bringing the medium to said safety valve, said lines being guided in segments inside said pressure vessel, said connector pipe and said housing block; and wherein
   a) said connector pipe is tubularly extended;
   b) said lines include a pressure bleeding conduit extending in said housing block;
   c) said connector pipe has a pressure bleeding opening formed therein being connected directly to said pressure bleeding conduit extending in said housing block;
   d) a flow conduit is extended inside said connector pipe for the medium to be blown off; and
   e) a cuff leads into the interior of said pressure vessel and spatially separates said flow conduit from said pressure bleeding opening.

2. The combination according to claim 1, wherein said pressure vessel has a region in which a static vessel pressure prevails being substantially unaffected by a flow process during blowoff, and said lines include a line for pressure bleeding being disposed inside said pressure vessel and said connector pipe for discharging into said region of said pressure vessel.

3. The combination according to claim 1, wherein said valve assembly is flanged radially to said tubularly lengthened connector pipe.

4. The combination according to claim 1, including at least one other valve assembly, said valve assemblies being flanged radially to said tubularly lengthened connector pipe.

* * * * *